United States Patent
Saitoh

(10) Patent No.: US 7,505,072 B2
(45) Date of Patent: Mar. 17, 2009

(54) NOISE-REDUCED MOBILE COMMUNICATION APPARATUS

(75) Inventor: Keiichi Saitoh, Ome (JP)

(73) Assignee: Casio Computer Co., Ltd., Tokyo (JP)

( * ) Notice: Subject to any disclaimer, the term of this patent is extended or adjusted under 35 U.S.C. 154(b) by 620 days.

(21) Appl. No.: 10/977,889

(22) Filed: Oct. 28, 2004

(65) Prior Publication Data

US 2005/0094016 A1    May 5, 2005

(30) Foreign Application Priority Data

Oct. 31, 2003  (JP)  ............................ 2003-373018
Mar. 29, 2004  (JP)  ............................ 2004-096616

(51) Int. Cl.
*H04N 5/222* (2006.01)
*H04M 1/02* (2006.01)
(52) U.S. Cl. .................. 348/333.01; 348/375; 455/296
(58) Field of Classification Search ............ 348/333.01, 348/357, 224.1, 375; 455/556.1, 296; 396/133
See application file for complete search history.

(56) References Cited

U.S. PATENT DOCUMENTS 6,823,198 B2 * 11/2004 Kobayashi ............... 455/556.1
2003/0071901 A1 * 4/2003 Katagiri et al. ........... 348/211.2
2003/0128316 A1 * 7/2003 Tsuji ............................ 349/113
2004/0116168 A1 * 6/2004 Usui ........................ 455/575.3
2004/0204064 A1 * 10/2004 Ikeda et al. .............. 455/556.1
2005/0024500 A1 * 2/2005 Katayama ............... 348/207.99
2007/0070235 A1 * 3/2007 Maejima et al. ............. 348/335

FOREIGN PATENT DOCUMENTS

| JP | 3-280625 A | 12/1991 |
| JP | 2000-261532 A | 9/2000 |
| JP | 2001-136082 A | 5/2001 |
| JP | 2001136082 | * 5/2001 |
| JP | 2001-320622 A | 11/2001 |
| JP | 2003-110675 A | 4/2003 |
| JP | 2003-179548 A | 6/2003 |

* cited by examiner

*Primary Examiner*—David Ometz
(74) *Attorney, Agent, or Firm*—Frishauf, Holtz, Goodman & Chick, P.C.

(57) ABSTRACT

A mobile communication apparatus that comprises an image pickup device (or camera module) comprising a lens driver (or AF motor), a display device (comprising a main display and a sub-display), and a display driver (comprising liquid crystal drivers) are disposed on a circuit board. The display driver and the image pickup device are disposed on the opposite sides, respectively, of the display device. Thus, the display driver and the lens driver of the image pickup device are distant from each other, thereby avoiding mutual interference by electromagnetic waves that may be produced by them.

3 Claims, 13 Drawing Sheets

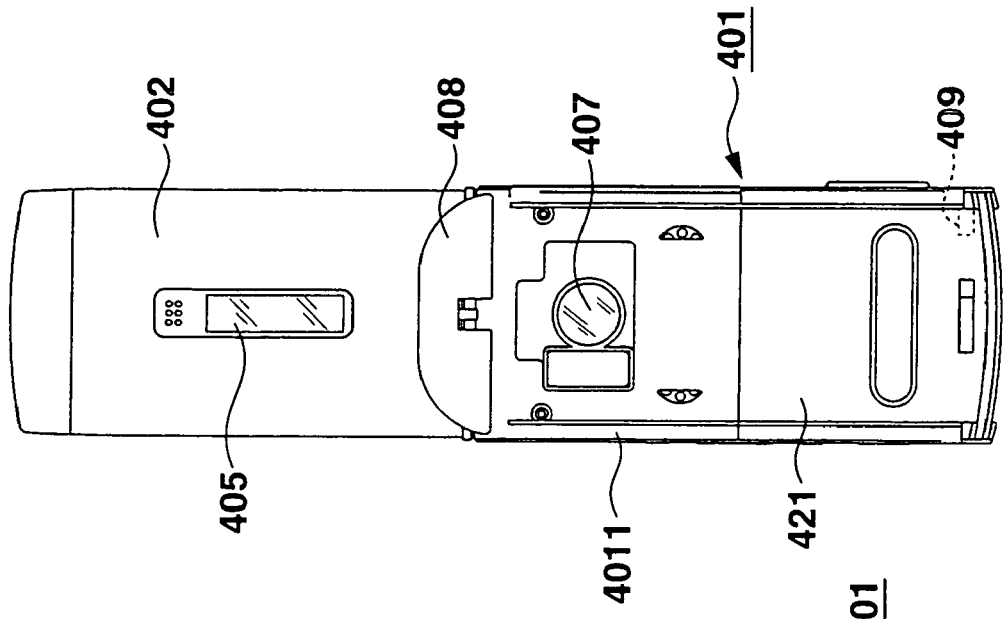
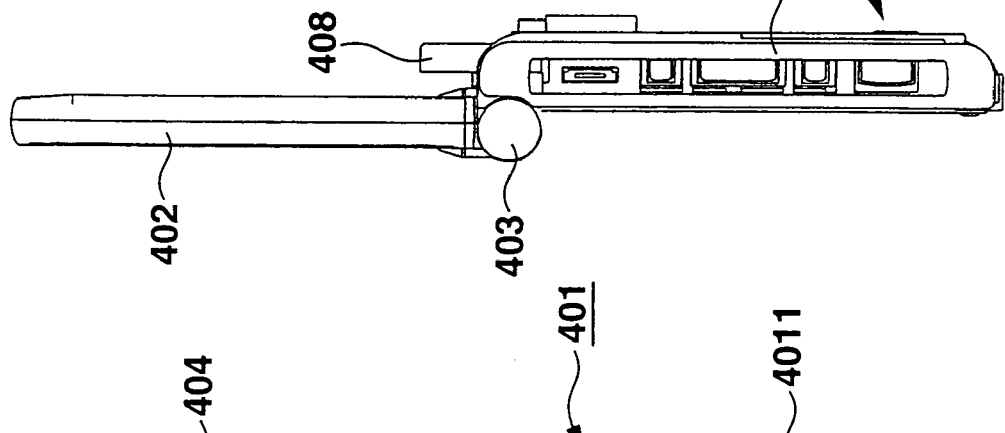
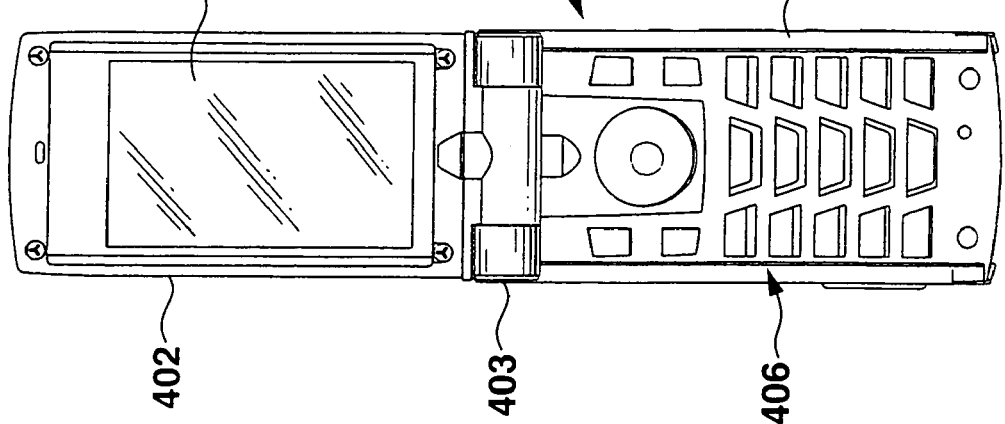

NOISE-REDUCED MOBILE COMMUNICATION APPARATUS

BACKGROUND OF THE INVENTION

The present invention relates to mobile communication apparatus with an image pickup device.

DESCRIPTION OF THE RELATED ART

Recently, mobile communication apparatus typical of mobile cellular phones with an image pickup device have diffused. In the past, in such communication apparatus the image pickup device is disposed along with a liquid crystal display of high resolution corresponding to a digital camera within the same housing to increase handiness for the user.

Recently, mobile cellular phones with an autofocus function to pick up an image of a megapixel class have appeared. In such cellular phone, the image pickup device comprises a step motor that drives a lens for focus adjustment, thereby acquiring a clear image.

The step motor, however, generates noise to adjust the lens movement in image pickup. Such noise would not be a problem in a dedicated device (or digital camera). However, with a mobile cellular phone, noise which may be generated can deteriorate the communication performance of the cellular phone. In the cellular phone with the image pickup device, this image pickup device must be implemented within the same implementation area as a mobile cellular phone without an image pickup device.

If the image pickup device is covered with a shield to reduce an adverse influence of noise on the peripheral drivers, its implementation area and hence the weight of the cellular phone would increase undesirably.

SUMMARY OF THE INVENTION

It is therefore an object of the present invention to provide a mobile communication apparatus of small high-density implementation free from influence of noise generated by the image pickup device that includes a lens drive mechanism.

In order to achieve the above object, the present invention provides a mobile communication apparatus comprising:
 a wireless communications device;
 a display device;
 a display driver that drives the display device; and
 an image pickup device including a lens driver that drives an image pickup lens thereof mechanically, the image pickup device being disposed along with the wireless communication device or the display drive device within a housing of the communication apparatus at a position where noise that may be generated by the lens driver has no influence on any of the wireless communication device and the display drive device.

BRIEF DESCRIPTION OF THE DRAWINGS

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIGS. 9A, 9B and 9C are a back, a side and a front view, respectively, of an open folding mobile cellular phone as a second embodiment of the present invention;

DETAILED DESCRIPTION OF THE INVENTION

First Embodiment

A first embodiment of the present invention will be described next in detail with reference to the drawings.

Figure 1A:
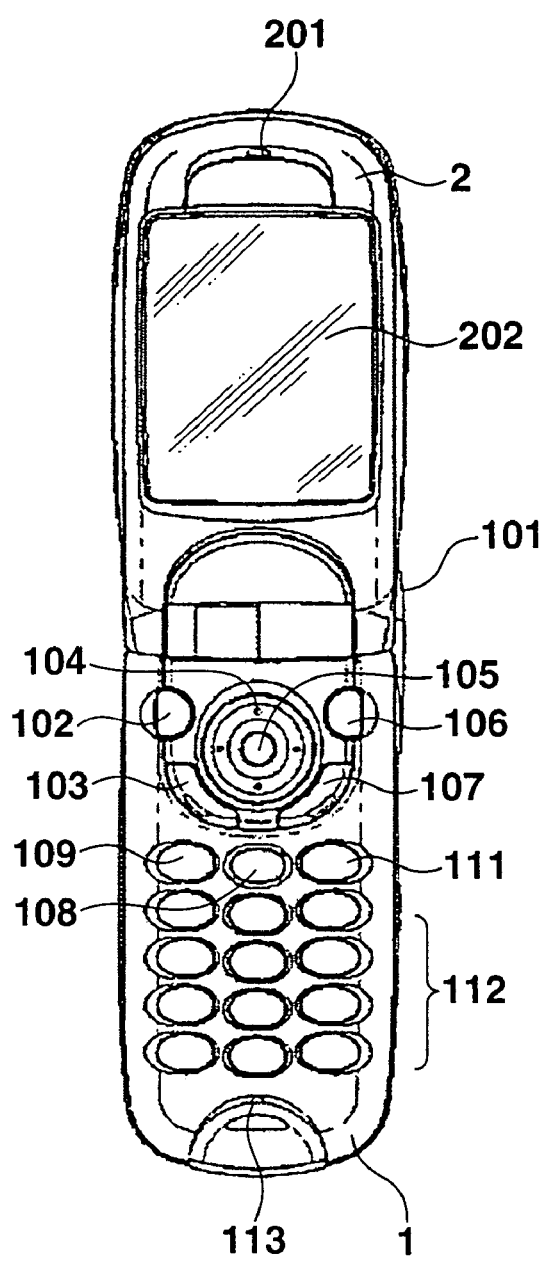
FIG. 1A is a front view of an open folding mobile cellular phone as one embodiment of the present invention.
Figure 1B:
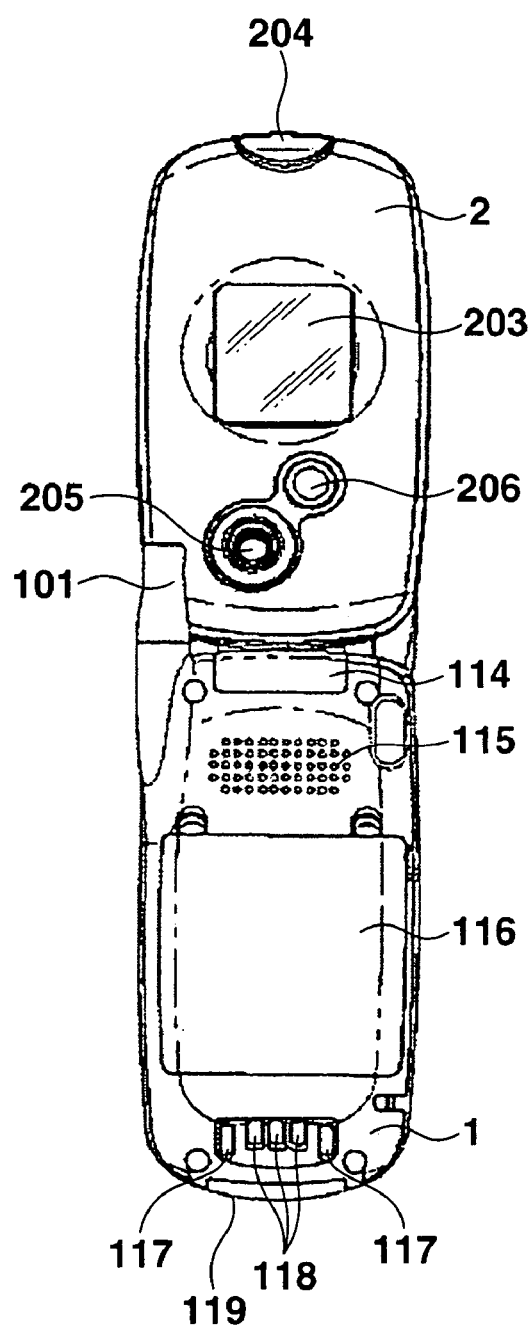
FIG. 1B is a back view of the cellular phone of FIG. 1A.

FIGS. 1A and 1B illustrate the front and back views, respectively, of an open mobile communication apparatus as the first embodiment according to the present invention.

The mobile communication device comprises a body 1 and a cover 2. In FIGS. 1A and 1B, the body 1 comprises an antenna 101, a camera key 102, a mail key 103, a cross key 104, a decision key 105, an address book key 106, a net connection key 107, a clear key 108, an on-hook key 109, an off-hook key 111, an alphanumeric key unit 112, a microphone 113, a card slot cover 114, a reporting speaker front 115, a cell pack 116, a charging terminal 117, a USB terminal 118 and a connector cover 119. The cover 2 comprises a speaker 201, a main display 202, a sub-display 203, a reporting LED 204, an image pickup lens 205 and a flashing LED 206.

Figure 2:
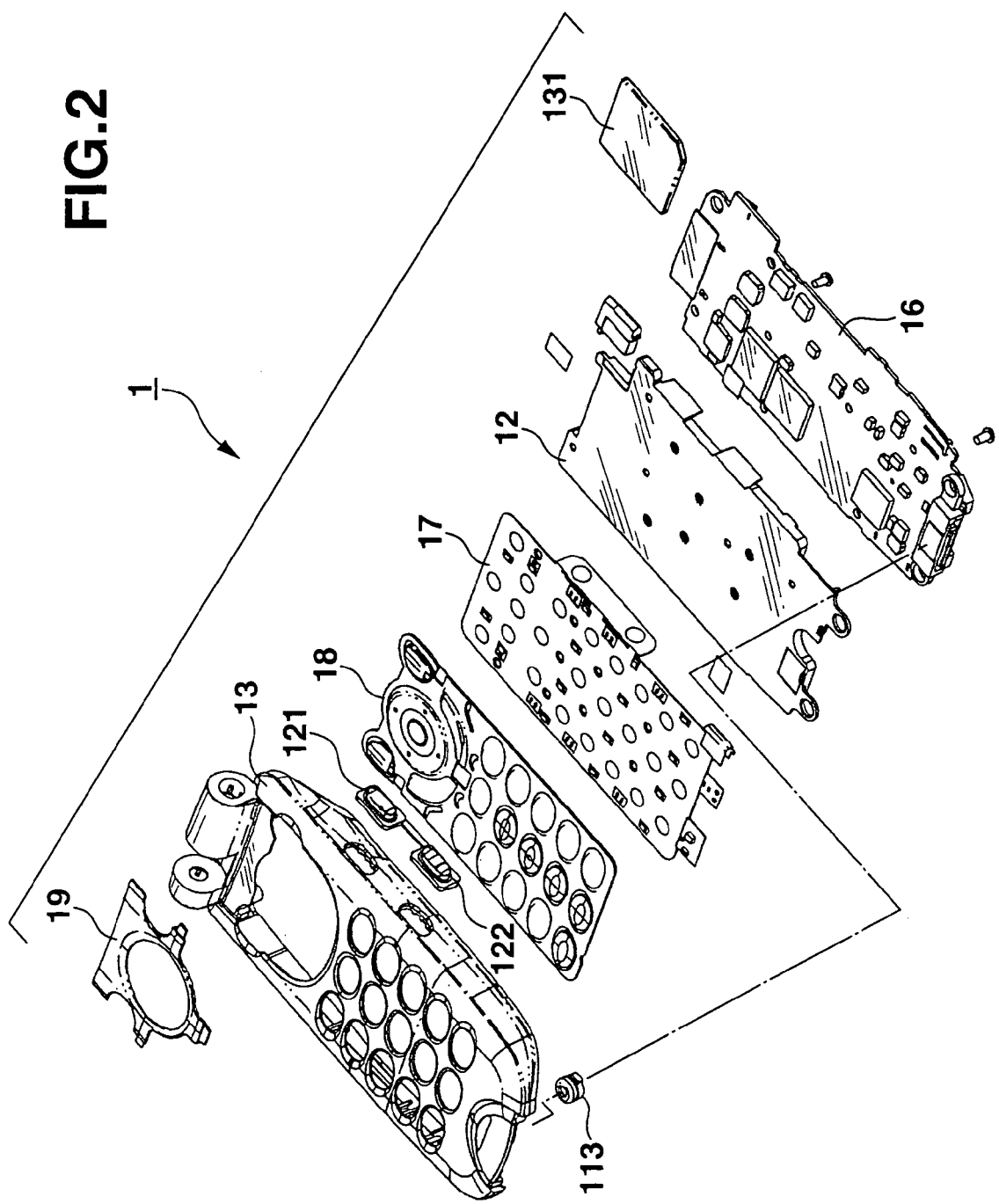
FIG. 2 is an exploded perspective view of a part of a body of the cellular phone of FIG. 1.

As shown in FIG. 2, the body 1 further comprises a main circuit board 16, an inner case 12 having a shielding structure that covers the main board 16, a key film board 17, and a key pad 18 layered in this order within an upper case 13. Reference numeral 131 denotes a memory card to be inserted into the main circuit board 16. A key top plate 19 is provided over the upper case 13. The microphone 113 is attached to the main circuit board 16. Keys 121 and 122 are provided on a bent side of the key film board 17.

Figure 3:
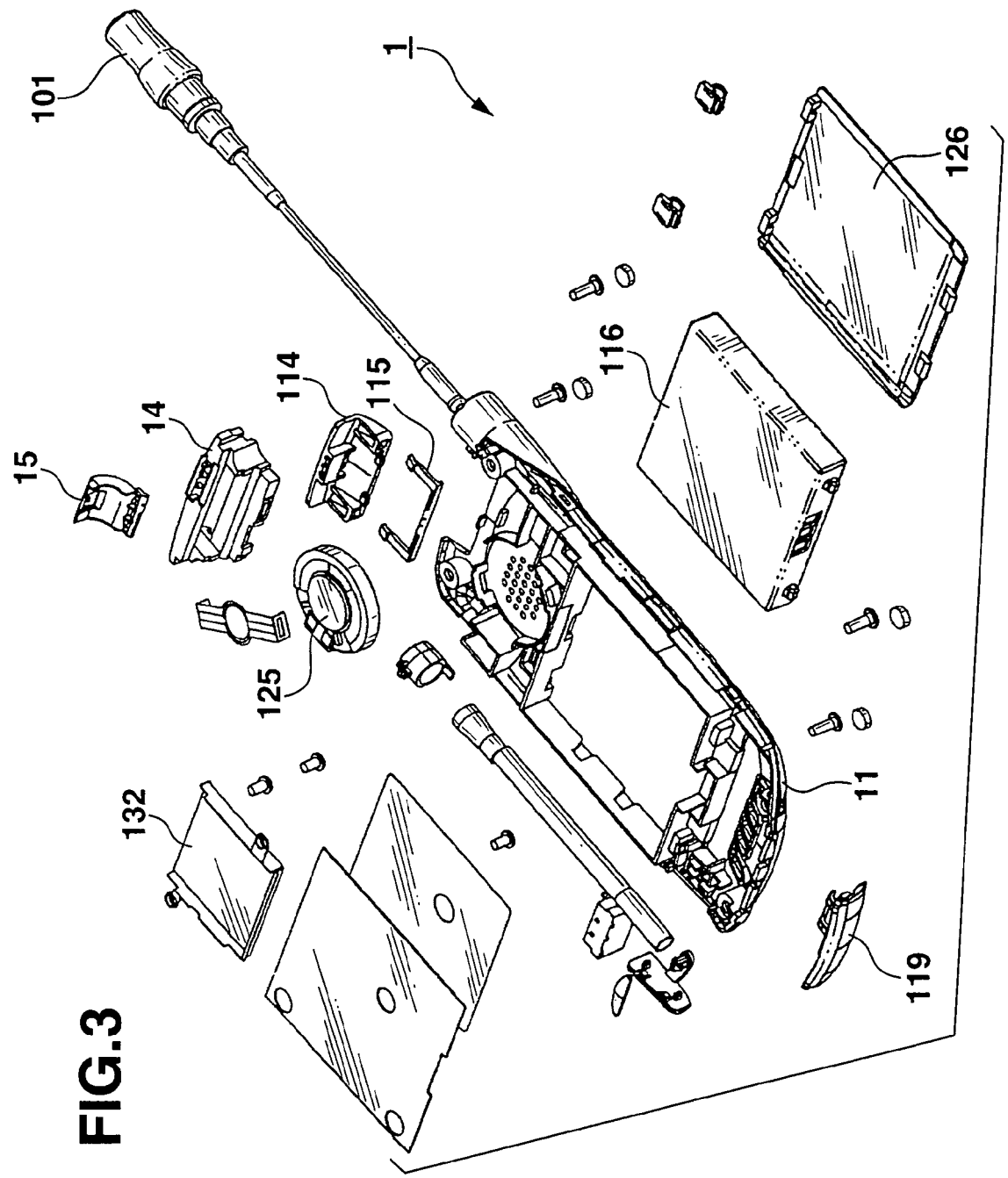
FIG. 3 is an exploded perspective view of the remaining part of the body of the cellular phone.

As shown in FIG. 3, the body 1 further comprises a lower case 11 with which an external memory shielding case 132, a reporting speaker 125, hinge pieces 14 and 15, a memory card slot cover 114, a cover fixing hock 115 are assembled along with a cell pack 116 covered with a cell cover 126.

Figure 4:
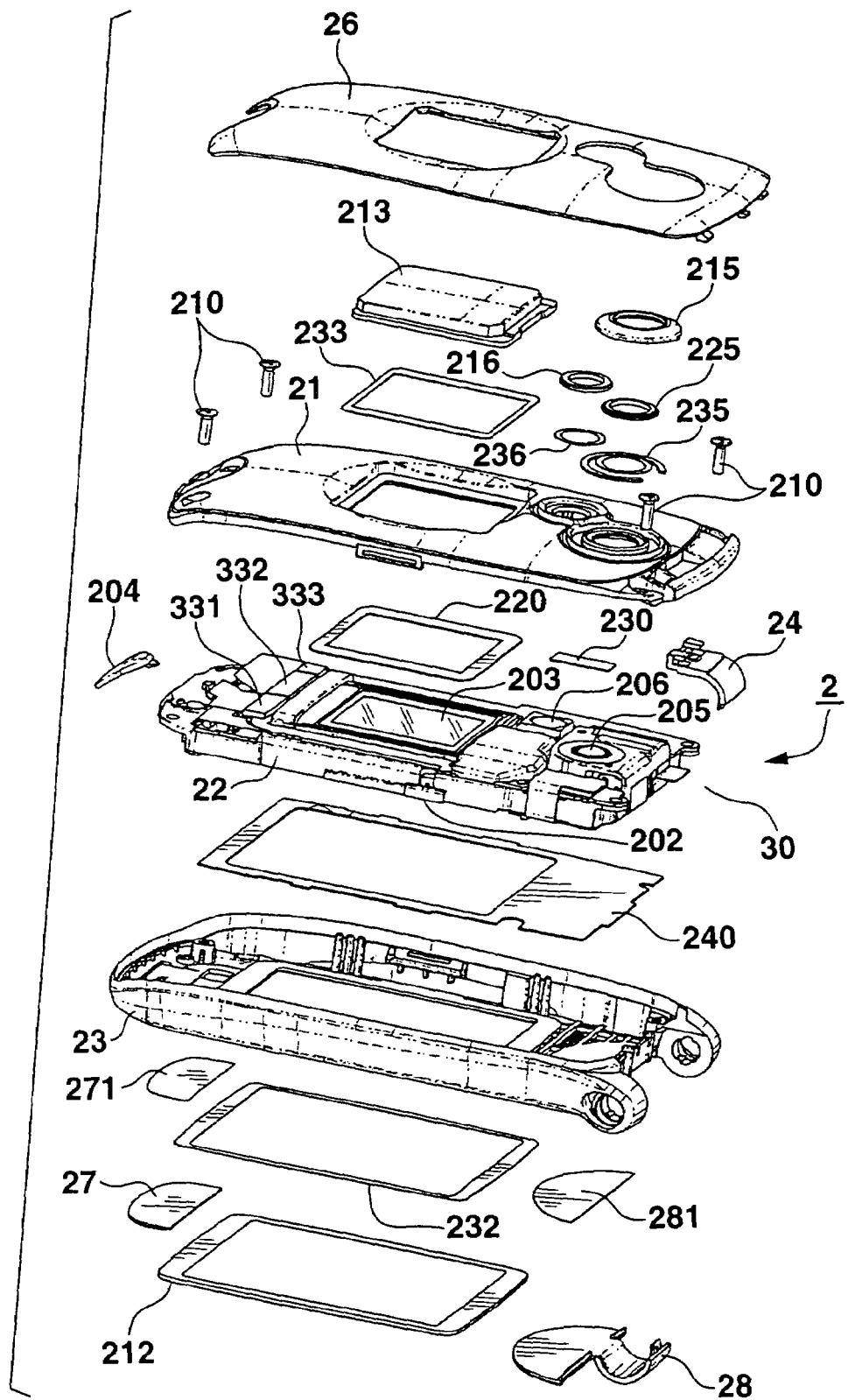
FIG. 4 is an exploded perspective view of a cover of the cellular phone.

As shown in FIG. 4, the cover 2 comprises a rectangular frame-like buffer member 240 with a liquid crystal panel, an inner structure 30, and a rectangular frame-like buffer member 220/a rectangular buffer member 230 layered within the upper case 23 with a hinge piece 24 held between the upper and lower cases 23 and 21 which are fixed by screws 210. A decorative panel 26 is attached to a surface of the lower case 21. A main display panel 212, a receiver cover 27 and a hinge piece 28 are attached to the upper case 23 through a rectangular frame-like double-faced adhesive 232, and semicircular double-faced adhesives 271 and 281, respectively. Ring-like lens panel and cover 225 and 215 are attached through a ring-like double-faced adhesive 235 to the lower case 21 around a hole provided in this lower case so as to align with a hole in the decorative panel 26 through which holes the image pickup lens 205 provided in the inner structure 30 appears.

A ring-like LED cover 216 is attached through a ring-like double-faced adhesive 236 to the lower case 21 around a hole provided in this lower case so as to align with a hole in the decorative panel 26 through which holes a flashing LED 206 provided in the inner structure 30 appears. A rectangular sub-display cover 213 is attached through a rectangular frame-like double-faced adhesive 233 to the lower case 21 around a hole provided in this lower case so as to align with a hole in the decorative panel 26 through which holes the sub-display 203 provided in the inner structure 30 appears. The inner structure 30 includes liquid crystal drivers 331, 332 and 333 provided on one end thereof.

Figure 5:
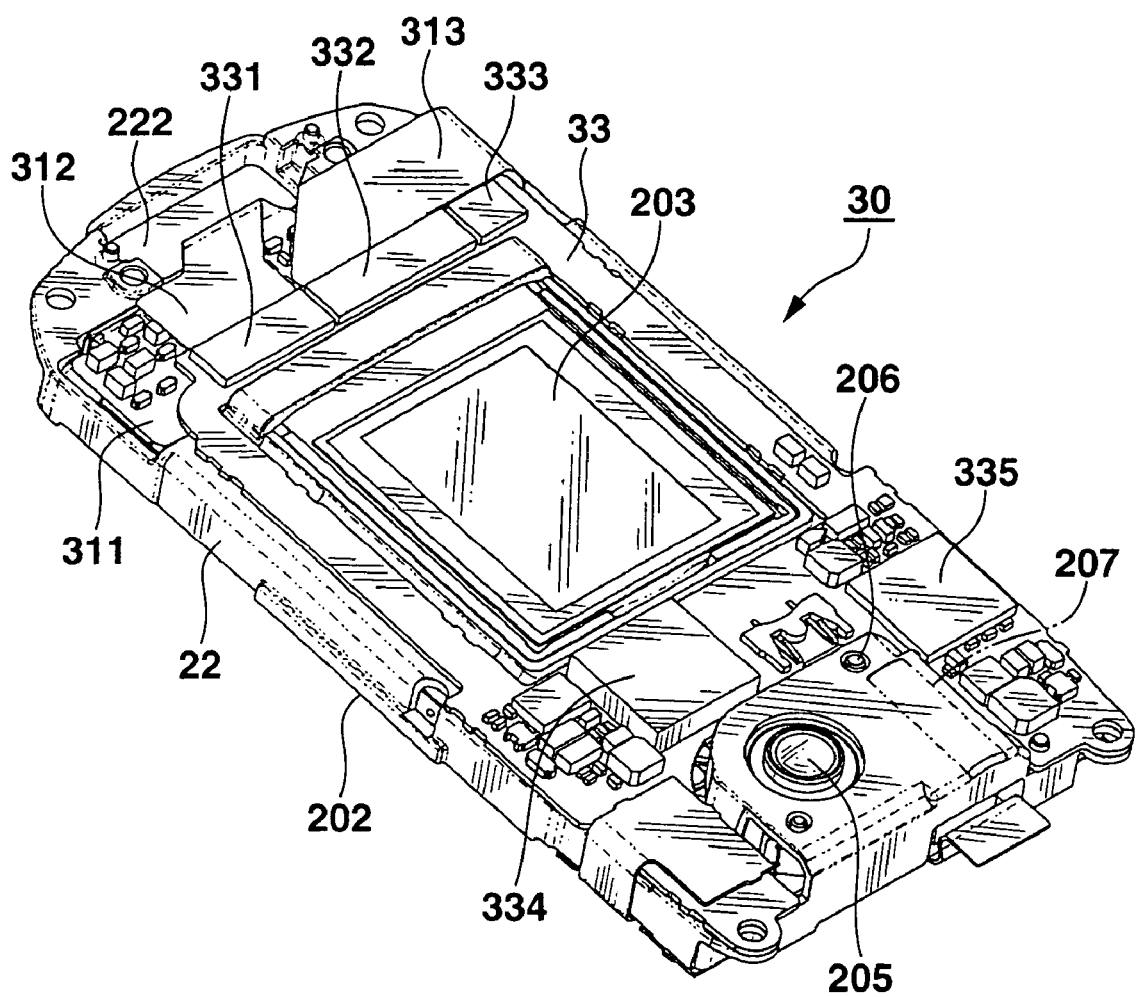
FIG. 5 is an enlarged perspective view of an inner case assembly of FIG. 4.
Figure 6:
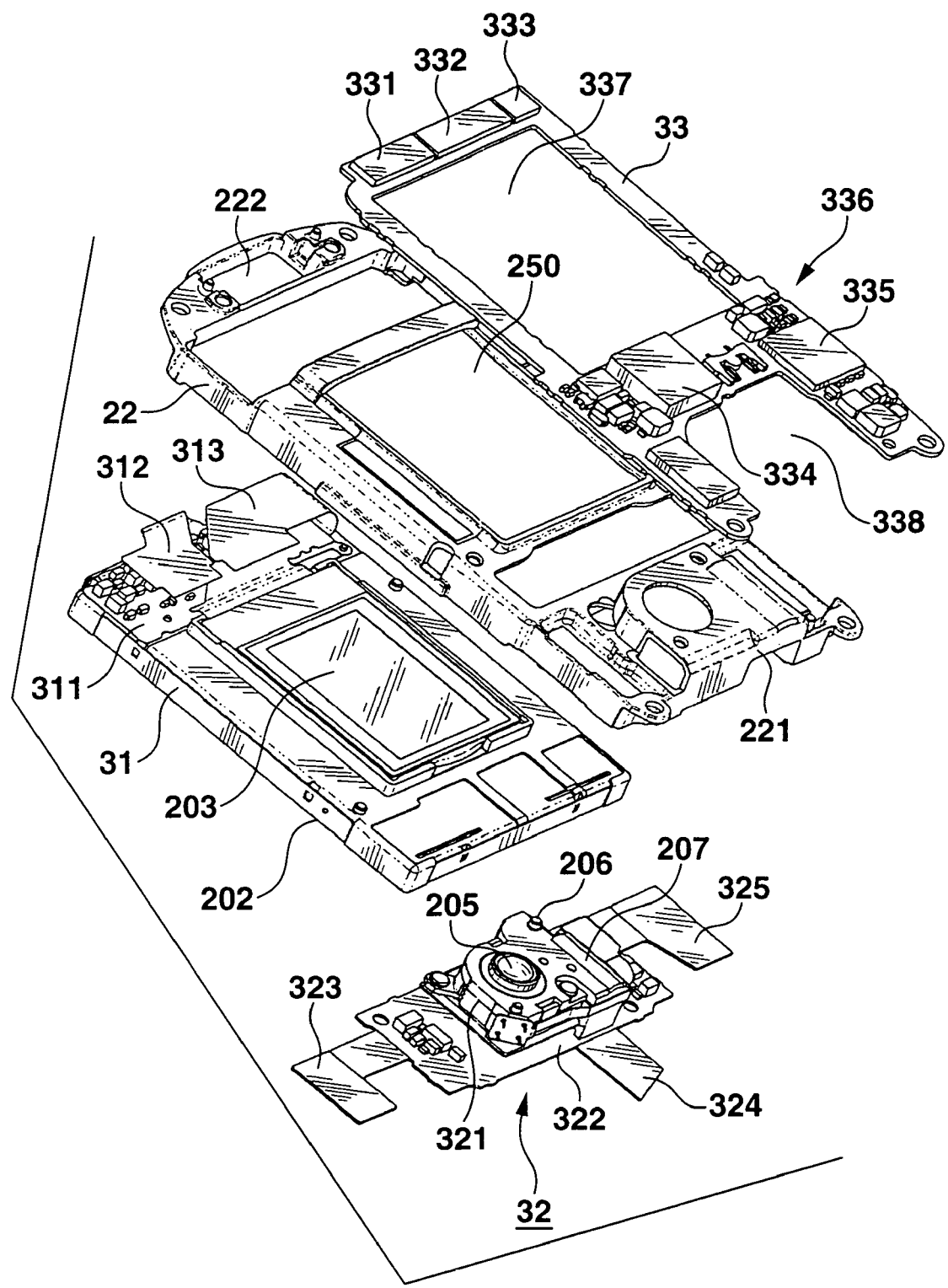
FIG. 6 is an exploded perspective view of the assembly of FIG. 5.

FIGS. 5 and 6 are a perspective and an exploded view, respectively, of the inner structure 30. As shown in FIGS. 5 and 6, the inner structure 30 comprises a shield case 31 with the sub-display 203, a camera module 32 and a sub-circuit board 33 that are assembled on an inner case 22. As shown in FIG. 6, a liquid crystal display board (not shown) of the main display 202 and a liquid crystal display board 311 of the sub-display 203 are provided back to back within the shielded case 31. In order to obtain the inner structure 30 of FIG. 5, the sub-circuit board 33 is disposed within the inner case 22 from below. The shield case 31 is then disposed within the inner case 22 from below. At this time, the main display 202 and the sub-display 203 are exposed on the front and back sides, respectively, of the inner case 250 from an opening 250 in the inner case 22. As also shown in FIG. 6, the camera module 32 is inserted from below into a camera module receiving section 221 formed at the hinge-side end of the inner case 22.

Figure 7:
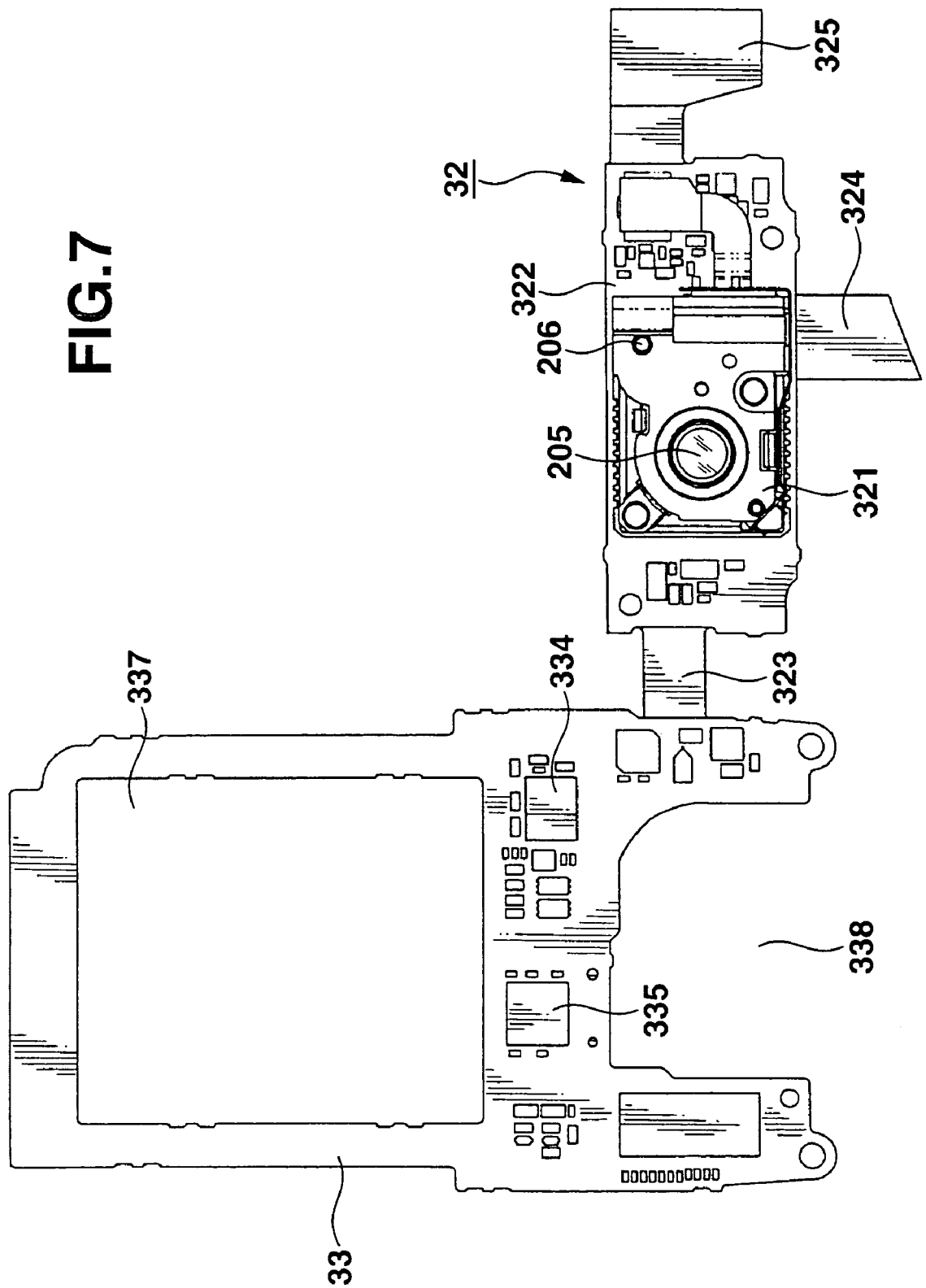
FIG. 7 is a plan view of a camera module and a sub-circuit board of FIG. 6 connected to each other.
Figure 8:
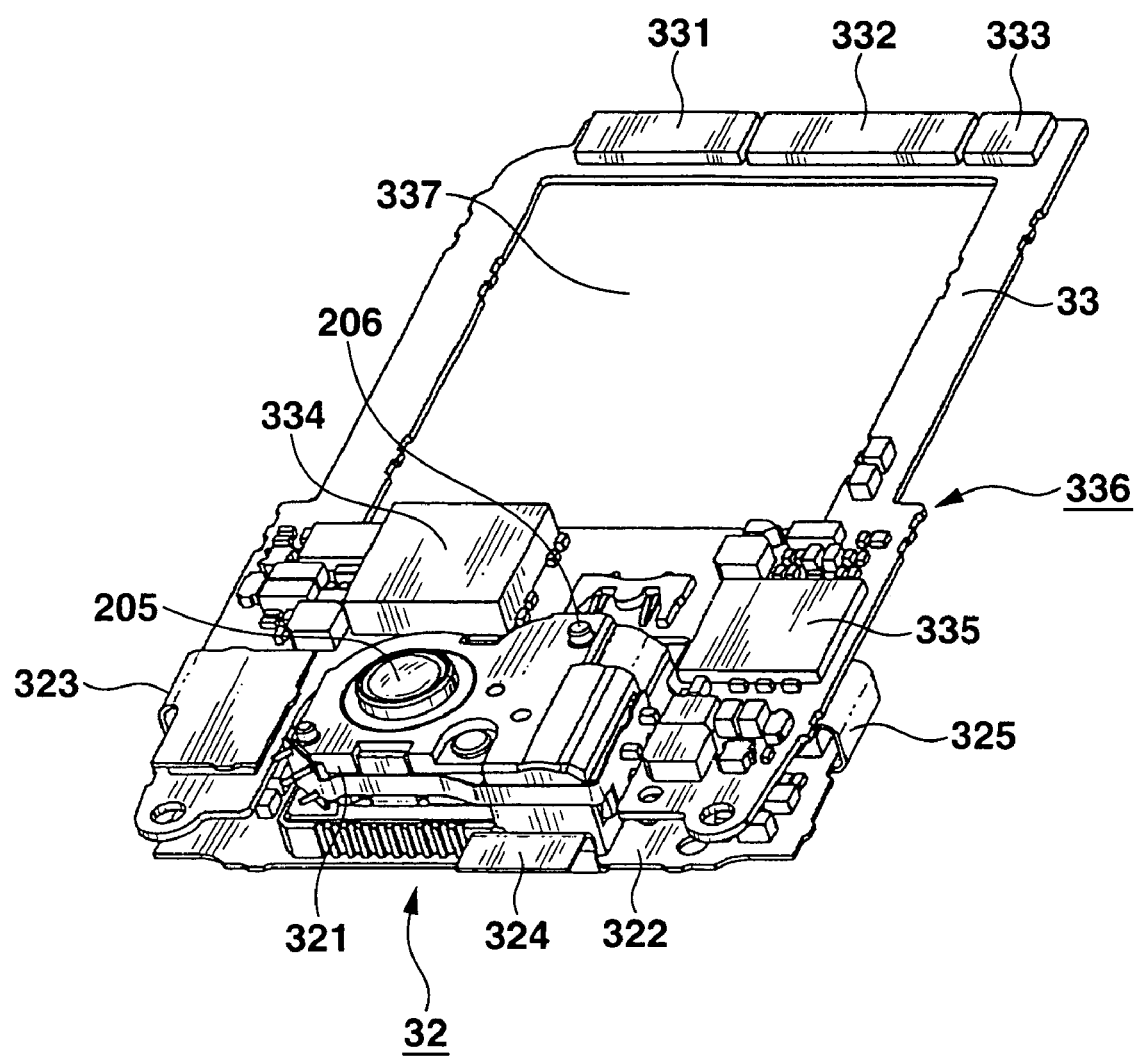
FIG. 8 is a perspective view of the camera module of FIG. 7 assembled with the sub-circuit board.

As shown in FIG. 6, the camera module 32 comprises the image pickup lens 205, the flashing LED 206 and an AF (autofocus) motor 207, which comprise a step motor, provided in a case 321 attached to a circuit board 322. As shown in FIG. 7, the circuit board 322 is electrically connected through heat seals (or flexible printed circuits: FPCs) 323, 324(?) and 325 to the sub-circuit board 33.

An opening 222 is provided at the other end of the inner case 22 in which an incoming-call reporting LED unit is disposed.

The sub-circuit board 33 has various electronic parts; more specifically, a group of liquid crystal drivers 331, 332 and 333 and a group of camera control parts 334 and 335 disposed respectively on opposite sides of the opening 337 in the sub-circuit board 3. The camera control parts 334 and 335 compose a camera control circuit 336.

The liquid crystal drivers 331-333 are connected electrically to heat shields (FPCs) 312 and 313 extending from the liquid crystal display board 311.

As described above, in the sub-circuit board 33 the main display 202 and sub-display 203 are disposed in the opening 337 thereof. The liquid crystal drivers 331-333 are disposed at one end of the sub-circuit board 33. The circuit board 322 of the camera module 32 that includes the AF motor 207 is disposed in the opening 338 in the other end of the sub-circuit board 33. Thus, the liquid crystal drivers 331-333 are most distant from the AF motor 207 that drives the image pickup lens 205 in the sub-circuit board 33 with the opening 337 (for the main liquid crystal display 202 and the sub-display 203) provided therebetween. The camera module 32 and the sub-circuit board 33 are composed of separate different members, respectively. Thus, since the AF motor 207 on the camera module 32 is separate from the liquid crystal drivers 331-333 on the sub-circuit board 33, the former can effectively avoid noise that may be produced by the latter and vice versa. No electromagnetic shields need be used to avoid an electromagnetic wave interference between the liquid crystal drivers 331-333 and the AF motor 207. Thus, the cover 2 can be reduced in thickness and weight, and the housing of the cover 2 in size.

Second Embodiment

A second embodiment of the mobile communication apparatus according to the present invention will be described next with reference to the accompanying drawings. In FIG. 9 (9A, 9B and 9C)-10, the communication apparatus comprises a body 401 and a cover 402 connected foldably by a hinge 403 at one end. The cover 402 has a main display 404 of a 16:9 aspect ratio on a front thereof and a sub-display 405 on a back thereof.

Figure 10:
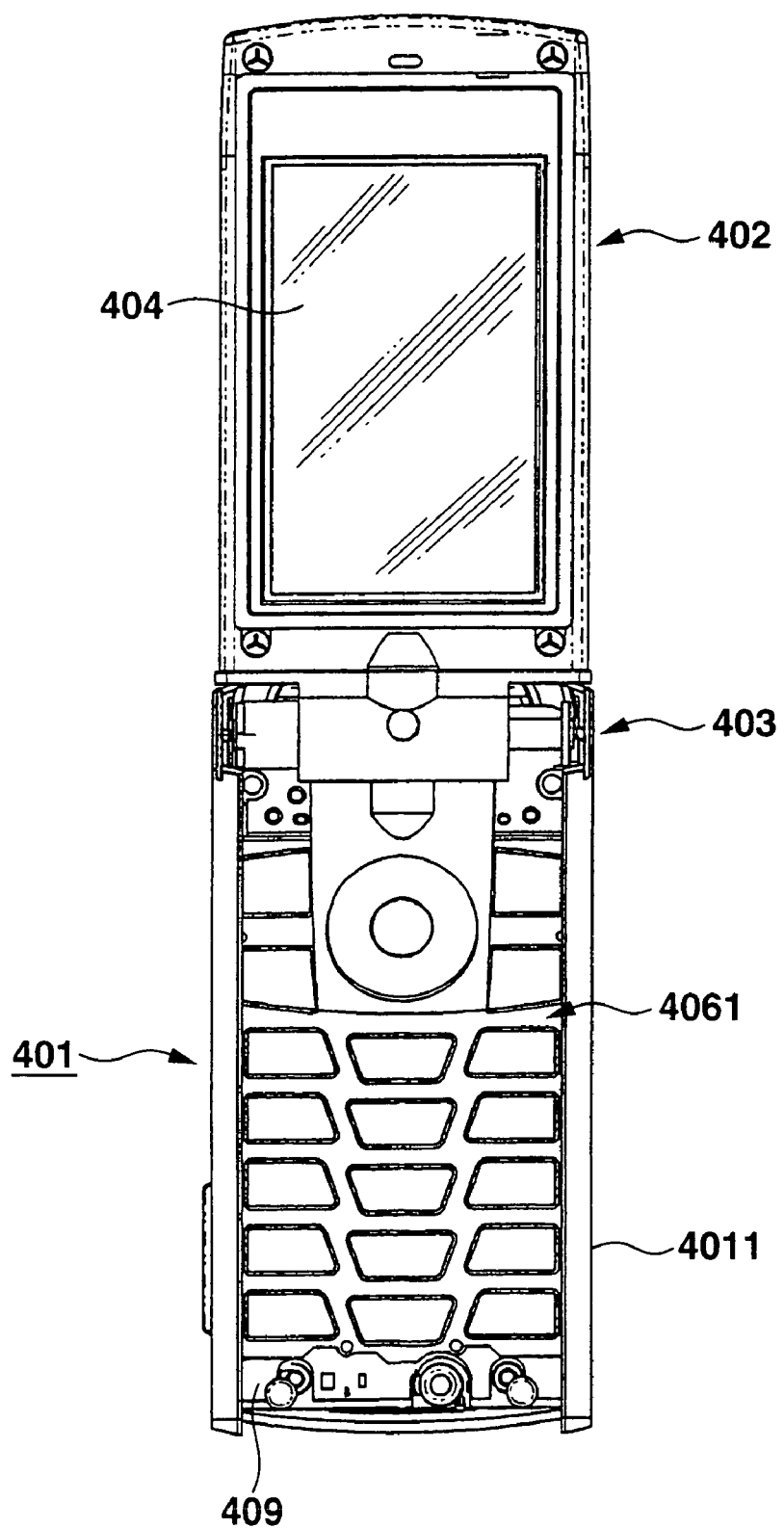
FIG. 10 is a front view of the cellular phone with an exposed manipulation board as the second embodiment.

The body 401 comprises a manipulation panel 406 on the front thereof and an image pickup device 407 on the back thereof. A main antenna 408 is provided near the hinge 403. As shown in FIGS. 9 and 10, a chip-like sub-antenna 409 is provided at an end of a manipulation board 4061 distant from the main antenna 408 in a state where a decorative panel for the manipulation panel 406 is removed.

The communication apparatus has a voice communicating function and a high-speed data communication function. Only the main antenna 408 is driven in voice communication whereas both the main antenna 408 and the sub-antenna 409 are driven in high-speed data communication, thereby obtaining a space diversity effect for data communication.

Generally, it is said that antennas are preferably provided such that the distance between them becomes maximum in the reception that uses a space diversity that requires a plurality of antenna elements in order to avoid interference between electromagnetic waves generated by the respective antennas.

Figure 11:
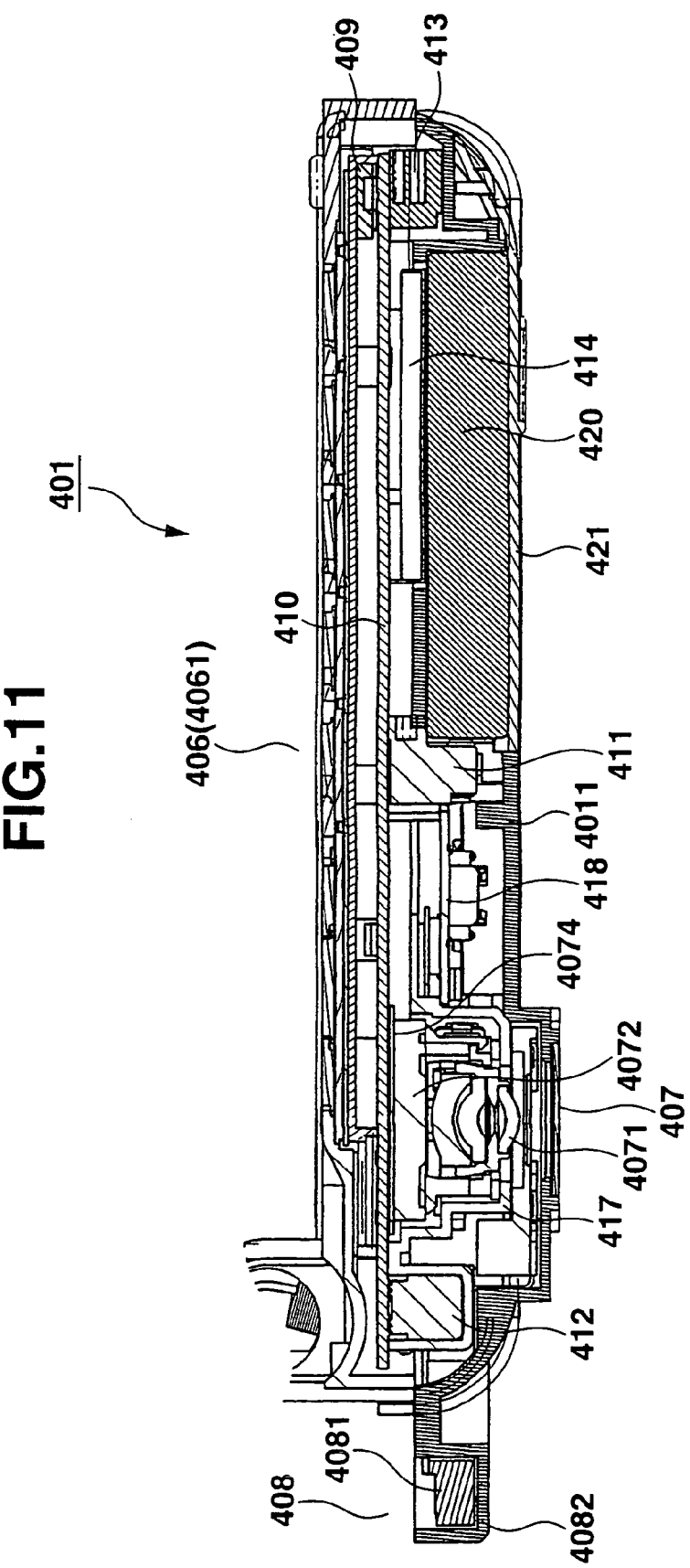
FIG. 11 is a central cross-sectional side view of the cellular phone body of FIGS. 9A-9C and 10.
Figure 12:
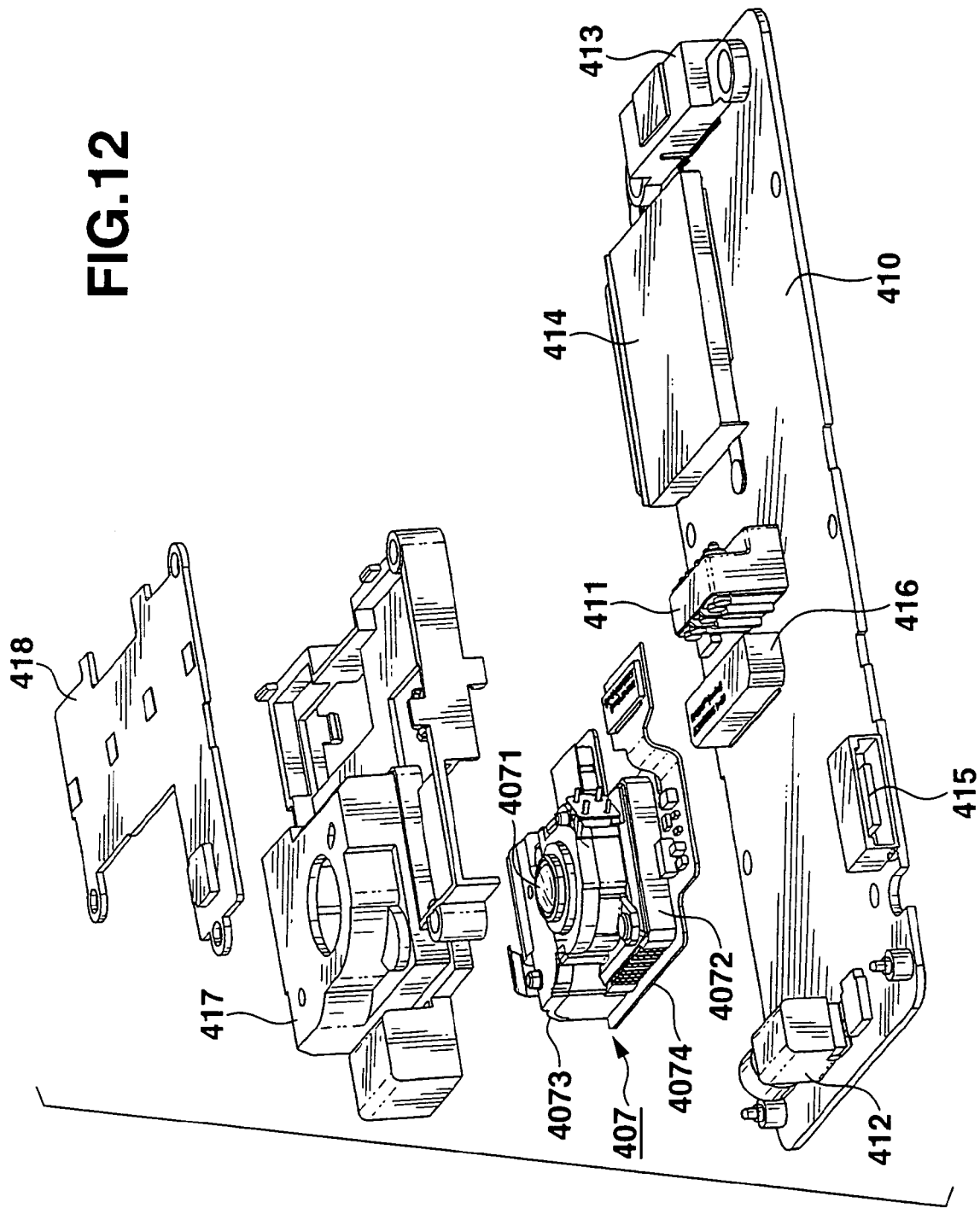
FIG. 12 is a exploded perspective view of the body of the cellular phone as the second embodiment.
Figure 13:
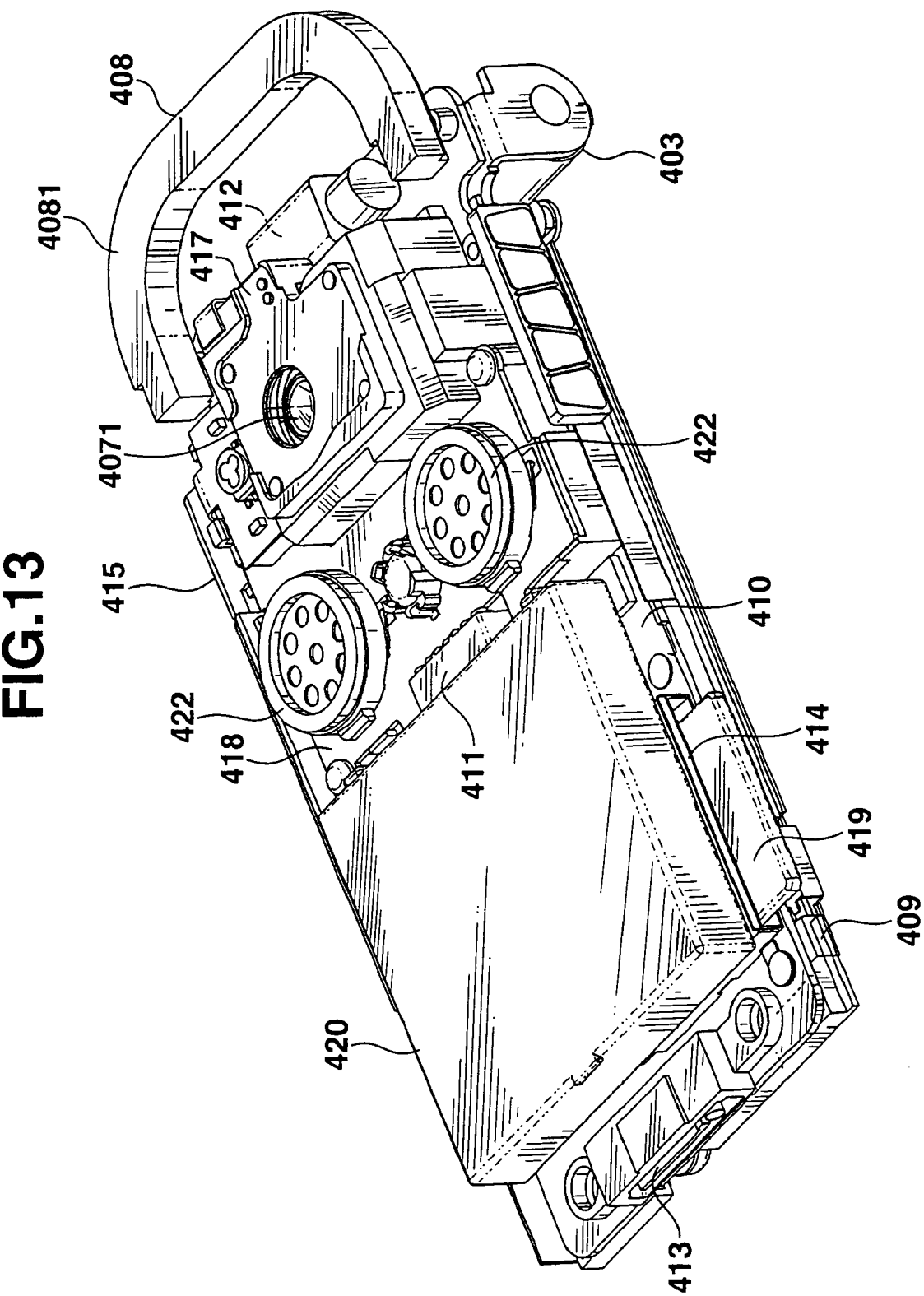
FIG. 13 is a perspective view of the back of a main circuit board of the cellular phone as the second embodiment.

As also seen better in FIGS. 11-13, a housing 4011 of its upper and lower cases encloses therein the manipulation panel 406 (or manipulation board 4061) provided on its front and the image pickup device 407 provided on a back side thereof. The body 401 comprises the main circuit board 410, the inner case 417 and the sub-circuit board 418 provided between the main antenna 408 and sub-antenna 409.

The image pickup device 407 comprises an image pickup lens 4071, an image pickup device (or CCD) 4072, and an AF (autofocus) motor 4073, which comprises a step motor that drives the lens, provided on a camera circuit board 4074.

The manipulation panel 406 with various operating keys is provided on an upper surface side of the main circuit board 410 and various electronic parts including the image pickup device (or camera unit) on a lower surface side of the main circuit board 410.

As shown in FIG. 12, a cell connection terminal 411 is provided on the opposite surface of the main circuit board 410 from the operation panel 406 at the midpoint of the main circuit board 410. A vibrator 412 is provided on one end of that surface of the main circuit board 410. The sub-antenna 409 and the external connection terminal 413 are respectively provided on opposite sides of the other end of the main circuit board 410.

A slot case 414 into which a memory card can be inserted is provided between the external connection terminal 413 and the cell connection terminal 411. A second external connection terminal 415 and an electronic part 416 are provided between the vibrator 412 and the cell connection terminal 411.

The image pickup device 407 is provided between the vibrator 412 and the cell connection terminal 411. The whole pickup device 407 is covered with a shielding inner case 417 except an exposed image pickup lens 4071 thereof.

The sub-circuit board 418 is attached to the inner case 417, and electrically connected to the main display 404 and the sub-display 405 of the cover 402 and also to the main circuit board 410.

As shown in FIG. 13, a cell pack 420 that connects to the cell connection terminal 411 is disposed on the slot case 414. As shown in FIG. 11, the housing 4011 has a cell cover 421 that openably covers an opening in the housing 4011 through which the cell pack 420 can be taken out of, or inserted into, the housing 4011. As shown in FIG. 13, a pair of speakers 422 is provided on the sub-circuit board 418.

As shown in FIG. 13, the main antenna 408 is in the form of a U and attached so as to hold the vibrator 412 between branches thereof at the end of the main circuit board 410 near the hinge 403. The main antenna 408 is covered with an antenna cover 4082 (shown in FIG. 11).

As described above, in the mobile communication apparatus of this embodiment the image pickup device 407 that comprises the image pickup lens 4071, image pickup element 4072, AF motor (or step motor) 4073 and camera circuit board 4074 is attached in the body 401. The U-like main antenna 408 is attached at one end of the housing 4011 while the sub-antenna 409 at the other end of the housing 4011. Thus, noise that may be produced from the AF motor 4073 and the camera circuit board 4074 of the camera unit 407 least influences the main antenna 408 and the sub-antenna 409. Although the image pickup device 407 (comprising the AF motor 4073) that is a noise producing source is implemented in the communication apparatus, an effective transmission/reception performance is ensured based on the space diversity effect.

Various modifications and changes may be made thereunto without departing from the broad spirit and scope of this invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Applications No. 2003-373018 filed on Oct. 31, 2004 and No. 2004-096616 filed on Mar. 29, 2004 and each including specification, claims, drawings and summary. The disclosure of the above Japanese patent application is incorporated herein by reference in its entirety.

What is claimed is:

1. A mobile communication apparatus comprising:
   a wireless communications device;
   a display device;
   a display driver that drives the display device; and
   an image pickup device including a lens driver that drives an image pickup lens;
   wherein the display driver and the image pickup device are disposed in a housing and are mounted on first and second circuit boards, respectively;
   wherein the display driver and the lens driver are disposed on opposite sides of an opening through which the display device is disposed; and
   wherein the opening, through which the display device is disposed, is provided in the first circuit board on which the display driver is mounted.

2. The mobile communication apparatus according to claim 1, wherein:
   the display driver is disposed on the first circuit board;
   the image pickup device is disposed on the second circuit board; and
   the first and second circuit boards are disposed in the housing.

3. The mobile communication apparatus according to claim 2, wherein:
   the first and second circuit boards are disposed in the housing with respect the display device such that the display driver is located on one end of the display device and the image pickup device is located on an opposite end of the display device.

\* \* \* \* \*